(12) United States Patent
Bai et al.

(10) Patent No.: US 10,296,837 B2
(45) Date of Patent: May 21, 2019

(54) COMMENT-COMMENT AND COMMENT-DOCUMENT ANALYSIS OF DOCUMENTS

(71) Applicant: SAP SE, Walldorf (DE)

(72) Inventors: Meilin Bai, Shanghai (CN); Xingtian Shi, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 670 days.

(21) Appl. No.: 14/884,732

(22) Filed: Oct. 15, 2015

(65) Prior Publication Data
US 2017/0109633 A1    Apr. 20, 2017

(51) Int. Cl.
*G06N 5/04* (2006.01)
*G06F 16/35* (2019.01)
*G06F 17/27* (2006.01)

(52) U.S. Cl.
CPC ............ *G06N 5/04* (2013.01); *G06F 16/353* (2019.01); *G06F 17/2745* (2013.01); *G06F 17/2785* (2013.01)

(58) Field of Classification Search
USPC .......................................................... 706/55
See application file for complete search history.

(56) References Cited

U.S. PATENT DOCUMENTS

| 8,484,228 | B2 | 7/2013 | Bhattacharyya et al. |
| 8,533,208 | B2 | 9/2013 | Sundaresan et al. |
| 8,554,701 | B1 | 10/2013 | Dillard et al. |
| 9,817,564 | B2 * | 11/2017 | Li ........................ G06F 3/0485 |
| 9,857,186 | B2 * | 1/2018 | Zhou .................... G01C 21/343 |
| 9,877,169 | B1 * | 1/2018 | Wang ...................... H04W 4/08 |
| 9,977,787 | B2 * | 5/2018 | Zhou ................ G06F 17/30174 |
| 9,984,118 | B2 * | 5/2018 | Hu .................... G06F 17/30445 |
| 9,984,544 | B2 * | 5/2018 | Wang .............. G08B 13/19645 |
| 10,031,517 | B2 * | 7/2018 | Li ..................... G05B 19/41865 |
| 10,048,669 | B2 * | 8/2018 | Zhou ................. G05B 19/0426 |

(Continued)

OTHER PUBLICATIONS

Text Preprocessing for Unsupervised Learning: Why It Matters, When It Misleads, and What to Do About It, Matthew J. Dennyy, Arthur Spirlingz, (Sep. 27, 2017).*

(Continued)

*Primary Examiner* — Michael B Holmes
(74) *Attorney, Agent, or Firm* — Klarquist Sparkman, LLP

(57) ABSTRACT

A system and method for analyzing documents, such as posts, on-line reviews and comments from people based on topics of the documents, to determine general sentiment of users is disclosed. Topics from the documents and their corresponding sentiment polarities are extracted. The documents are regarded to be constituted by a series of topics. The sentiment for a topic is represented by a quadruple (k, so, h, i), where k is the topic, so is the sentiment opinion, h is the comment or post holder, and i is the document. A quintuple (k, sup, p, n, ne) is used to illustrate the topics and corresponding sentiments and is stored in S, where sup indicates the frequency of the topic, and p (positive), n (negative) and ne (neutral) are different types of opinions of the users. From the quintuple set S, every topic is related to three kinds of sentiment opinions (positive, negative, and neutral), enabling determination of popular topics in documents as well as the users' sentiment polarities.

18 Claims, 6 Drawing Sheets

(56) References Cited

U.S. PATENT DOCUMENTS

| | | | |
|---|---|---|---|
| 10,055,776 B2* | 8/2018 | Nemery | G06Q 30/0631 |
| 10,067,981 B2* | 9/2018 | Fan | G06F 17/3048 |
| 10,068,186 B2* | 9/2018 | Shi | G06N 99/005 |
| 10,083,413 B2* | 9/2018 | Sun | G06Q 10/06315 |
| 10,083,448 B2* | 9/2018 | Cheng | G06Q 50/30 |
| 2010/0280985 A1* | 11/2010 | Duchon | G06N 7/005 706/52 |
| 2013/0110928 A1 | 5/2013 | Ghosh et al. | |
| 2013/0212059 A1 | 8/2013 | Ameri-Yahia et al. | |
| 2013/0325877 A1* | 12/2013 | Niazi | G06Q 30/0203 707/748 |
| 2015/0095407 A1 | 4/2015 | Li et al. | |
| 2016/0314106 A1* | 10/2016 | Carrier | G06F 17/241 |

OTHER PUBLICATIONS

Multilingual Sentiment Analysis: State of the Art and Independent Comparison of Techniques, Kia Dashtipour, Soujanya Poria, Amir Hussain, Erik Cambria, Ahmad Y. A. Hawalah, Alexander Gelbukh, Qiang Zhou, Cogn Comput (2016) pp. 757-771 DOI 10.1007/s12559-016-9415-7.*

Elsevier SciVerse ScienceDirect Procedia Computer Science 17 ( 2013 ) pp. 26-32 1877-0509 © 2013 Information Technology and Quantitative Management (ITQM2013) The Role of Text Pre-processing in Sentiment Analysis, Emma Haddia, Xiaohui Liva, Yong Shib.*

Wikipedia, Vector space model, 2004, https://en.wikipedia.org/wiki/Vector_space_model.

David M. Blei et al., Latent Dirichlet Allocation, Journal of Machine Learning Research 3, 2003, http://jmlr.csail.mit.edu/papers/v3/blei03a.html.

Christopher D. Manning et al., Stemming and lemmatization, Introduction to Information Retrieval, 2008, Cambridge University Press, http://n1p.stanford.edu/Ir-book/html/htmledition/stennming-and-lemmatization-1.html.

* cited by examiner

```
Create a corpus D with N documents
Apply LDA to identify K topics
Define a data set T of quadruple and initialize T to NULL
Define K-dimensional vector sup indicating support for every topic
        //Calculate sentiment for every comment of every document in D
        For i from 1 to N
                Define M = number of comments in document i
                For j from 1 to M
                        Obtain holder h from comment j
                        For each topic k in comment j
                        If $\theta_{jk}$ greater than threshold
                                Increase sup(k) by $\theta_{jk}$
                                Calculate sentiment opinion so = GetSentiment($<i, j>$, k)
                                Insert (k, so, h, $<i, j>$) into T
                        /Comment does not contain any topics
                        If no topic found in document i
                                If comment j is a reply of comment j' and j' < j
                                        Set the attitude att of j to j'
                                        For each topic k' in comment j'
                                                $\Theta_{jk'} \leftarrow \Theta_{j'k'}$
                                                Increase sup(k') by $\Theta_{jk'}$
                                                Read the sentiment so' for (k' (comment $<i, j'>$))
                                                Update sentiment so for (k, $<i, j>$) to so'*att
                                                Insert (k', so, h, $<i, j>$) into T
        //Count holders for every topic
        For all identical (k, h) in T, remove all but the latest one
        Define a data set S of quintuple and set it to NULL
        For each topic k in T
                Initialize variables p, n, and ne all to 0
                For each sentiment so for topic k
                        If so equals to 1
                                Increase p by 1
                        Else if so equals to -1
                                Increase n by 1
                        Else if so equals to 0
                                Increase ne by 1

Insert (k, sup(k) p, n, ne) into S
```

GetSentiment(<i, j>, k)
Input: topic k, comment j of document i

Output: sentiment polarity so

Find corresponding sentiment opinion of topic k in comment j of document i
    If found
        Assign 1, -1 or 0 to so
        Else if j is a reply of some earlier post j'
            Find attitude att of j to j' and sentiment so' of topic k in j'
        If found
            $so \leftarrow so'^{*}att$
        Else
            $so \leftarrow 0$
    Else
        $so \leftarrow 0$ 300b

FIG. 3b

COMMENT-COMMENT AND COMMENT-DOCUMENT ANALYSIS OF DOCUMENTS

TECHNICAL FIELD

The present disclosure relates to computer systems, and more specifically, to a framework for determining user sentiments of topics in documents.

BACKGROUND

Sentiment analysis has been widely applied to on-line posts, such as news, reviews and social media, including comments, and discussions, for different applications. Such applications range from marketing to customer service. In general, sentiment analysis aims to determine attitude or sentiment opinion of a speaker or a writer with respect to some topic.

In numerous cases, posts, particularly with social media and on-line discussions, have multiple topics. For example, an on-line discussion may include multiple topics due to numerous comments from different users, particularly as the discussion progresses. The topics may share different sentiment opinions. For example, comments or posts from different followers may present their sentiment opinions. Furthermore, new topics may be presented by followers. As such, a gathering of posts from one origin may diverge in topics, each of which receives distinct attentions of people, and different topics would have different sentiment polarities.

An important aspect of sentiment analysis is to extract topics and their corresponding sentiment polarities from a series of posts. For example, a news supplier would be interested to learn what news are most favourable or a manufacturer would like to discover the advantages and defects of its products in order to make better products.

The present disclosure relates to a method and system to effectively and efficiently analyze posts, such as documents and related comments to identify multiple topics and their corresponding sentiment polarities.

SUMMARY

A framework for sentiment analysis is described herein. In accordance with one aspect, the framework is a computer-implemented method performed by a computer system to determine sentiments of users for topics. The method includes providing a plurality of posts to form a corpus. The posts of the corpus include origin posts and comments to the origin posts. Related posts which include an origin post and comment posts are grouped as a document. The posts are pre-processed to form vectors. The pre-processed posts are processed using topic modelling to extract topics of the posts. The posts are mapped to the topics to form post-topic pairs. The post-topic pairs are analyzed to determine the sentiments of those topics by holders of the posts. The relationships of posts and topics within a document are identified.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIGS. 3a-3b show pseudo codes of an embodiment of a sentiment analysis process.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework is provided for analyzing documents to determine user sentiments or tendencies of topics in the documents. In one embodiment, the framework analyzes comment-comment and comment-document structures and detects their relationships. Based on the structures, the framework determines user sentiments or tendencies. The user sentiments may be categorized generally as positive, negative or neutral. Providing other granularities of user sentiments may also be useful. The user sentiments may be based on current or recent documents, which include on-line reviews, posts and comments available on the internet. Obtaining user sentiments from other types of documents may also be useful.

Figure 1:
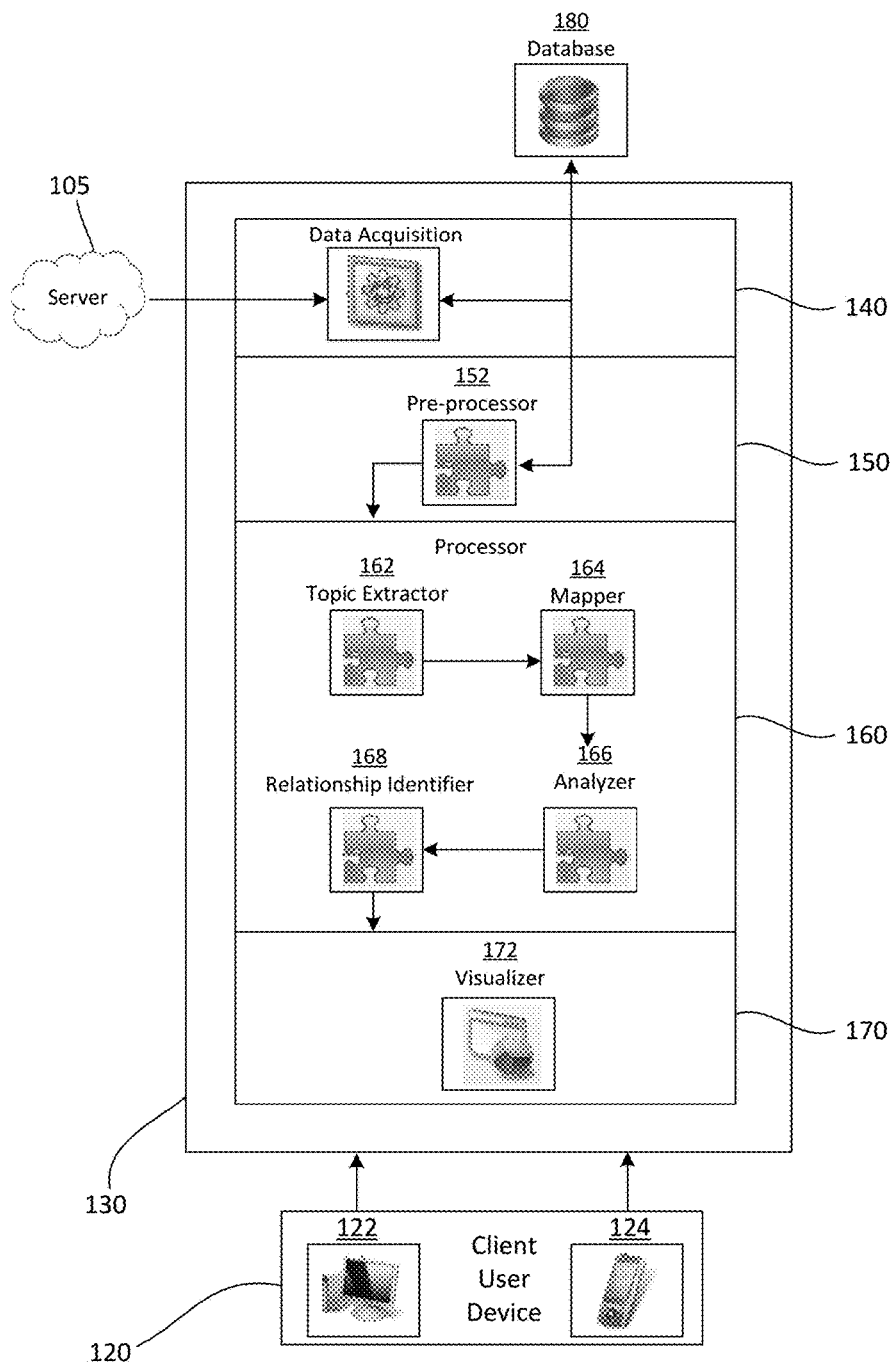
FIG. 1 shows a simplified diagram of an exemplary sentiment analysis system.

FIG. 1 shows a simplified block diagram of an exemplary embodiment of a sentiment analysis system 100. The analysis system 100, for example, may have a distributed architecture, such as a client-server architecture. In a distributed architecture, a server is accessible by client or user devices 120. Other types of architectures may also be useful.

In the distributed architecture, the server may include one or more computers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component.

In a case where the server includes more than one computer, the computers are connected through a communication network such as an internet, intranet, local area network (LAN), wide area network (WAN) or a combination thereof. The servers, for example, are part of the same private network. The servers may be located in single or multiple locations. Other configurations of servers may also be useful.

As for the client or user devices, they may be any computing devices. A computing device, for example, includes a local memory and a processor. The computing device may further include a display. The display may serve as an input and output component of the user device. In some cases, a keyboard or pad may be included to serve as an input device. The memory may be volatile or non-volatile types of non-transitory computer-readable media such as magnetic media, optical media, RAM, ROM, removable media, or any other suitable memory component. Various types of processing devices may serve as user devices. For example, the user devices may include a personal computer 122 or a smart phone 124. Other types of user devices, such as laptops or tablet personal computers (PCs) may also be useful.

The user devices may communicate with the server through a communication network, such as the internet, intranet, LAN, WAN or a combination thereof. Other types of networks may also be useful. In some cases, the network may be a cloud. The user may connect to the server using a user device. The user device may be referred to as the client side while the server may be referred to as the server side.

As shown, the sentiment analysis system includes a sentiment analyzer 130. The analyzer, for example, resides in the server. The analyzer includes various modules for generating sentiments and tendencies of users from various types of posts. In one embodiment, the analyzer includes a data acquisition module 140, a pre-processor module 150, a processor module 160 and a visualizer module 170. Other types of modules may also be included. The user may communicate with the analyzer through, for example, a user interface (UI) on end user devices. For a web-based application, the UI may be a web browser. Other configurations of the analyzer may also be useful. For example, the analyzer may be a stand-alone system or an application running on a computer.

The data acquisition module obtains documents from the internet. The documents may be obtained from various sources, such as on-line communities. On-line communities include, for example, social media networks, such as Facebook®, LinkedIn®, Twitter®, Myspace®, Google+®, and Match.com®, review sites, such as food sites, travel sites, and product review sites, on-line sellers, such as Amazon® and eBay®, and news sites. Obtaining documents from other sources or on-line communities may also be useful.

A document may be an article or a post. A document may include one or more comments to the article or post (original post). The original post may be considered as an original comment. A comment may also be referred to as a post. A comment or post may include one or more topics. Furthermore, comments and posts from different sources may have different formats. Generally, a post or comment includes text, source (user or poster), time stamp of the post, relationship information, such as @ and reply or other types of relationships, as well as other context information.

As a simple example, a group of related posts or comments may be as follows:

Question from holder A: I am from US, any suggestion of touring places in Shanghai, food, and souvenirs?
Reply from holder B: The bund area is definitely a place to go, Xiaolongbao is the traditional food worth trying.
Reply from holder A: Yu Garden is quite and has over 100 years' history.
Reply from holder C: Xiaolongbao is from Taiwan, not Shanghai! Have you really been to Shanghai?
Reply from holder D: Yu Garden is NOT quite! Last summer, it was full of people, I could barely breath.
Reply from holder B: Xiaolongbao is of course from Shanghai, I was borne and raised in Shanghai.
Reply from a holder E: I will go to US for vacation, any recommendation from you?

As shown, the question from holder A may be referred to as a post or an original comment while the other replies are referred to as comments. The group of related comments may be referred to collectively as a document. The related comments of the above example may be referred to as "Document 1". As such, a document includes the original post and comments.

The data acquisition module includes an acquisition unit for obtaining documents, such as posts from, for example, the internet 105. In one embodiment, the acquisition unit includes a web crawler. The acquisition unit searches or crawls the web or internet and retrieves documents. The acquisition unit may be configured to crawl the web to retrieve documents periodically or according to a schedule. Alternatively, the acquisition unit may be configured to crawl the web to retrieve documents continuously.

The documents found by the acquisition unit are stored in a repository 180. The repository may include a database. The database, for example, may be a relational or non-relational database or Structured Query Language (SQL)-based database. In one embodiment, the database includes in-memory, such as SAP HANA database from SAP SE. Other types of databases may also be useful. For example, traditional or in-memory data repositories or databases may be employed. In one embodiment, the retrieved documents form a corpus of the analysis.

The pre-processor module includes a pre-processor unit 152. Providing the pre-processor module with other units may also be useful. The pre-processor unit prepares the documents for analysis by the processor module. The document preparation includes various types of processes, for example, data cleaning, stop word removal, stemming and lemmatization, tokenizing, text vectorization and semantics analysis. Stemming and lemmatization are described in, for example, "http://nlp.stanford.edu/IR-book/html/htmledition/stemming-and-lemmatization-1.html", which is herein incorporated by reference for all purposes. Performing additional or other document preparation processes may also be useful.

As an example, a post, such as a comment (Reply from holder D in Document 1) to an original post, which is "Yu Garden is NOT quite! Last summer; it was full of people. I could barely breath", may be pre-processed as follows:

removal of the terms and punctuations such as "it", "of", "!", and "was";
changing the term "people" to "person"; and
changing the term "quite" to "quiet".

The remaining and converted terms of the comment are used to form a vector, for example, of the post. In one embodiment, vectors are formed using a vector space model technique in which each dimension represents the term frequency-inverse document frequency (tf-idf) of the term in the comment. The vector space model technique is described in, for example, "https://en.wikipedia.org/wiki/Vector_space_model", which is herein incorporated by reference for all purposes.

For a document which includes a plurality of related posts, it may also include a plurality of vectors corresponding to the original post and comments. The vectors may be arranged in sequence according to time of creation, for example, using a time stamp. The vectors may be ordered from earliest to latest in time.

The pre-processed documents or posts may be stored in the database. The pre-processed documents may be provided to the processor module directly from the pre-processor module or retrieved from the database by the processor module. Other configurations of providing pre-processed documents to the processor module may also be useful.

The processor module processes the pre-processed documents. In one embodiment, the processor module includes a document topic extractor unit 162, a mapper unit 164, an analyzer unit 166 and a relationship identifier unit 168. Providing the processor module with other units may also be useful.

The document topic extractor unit mines the pre-processed documents in the corpus for topics. For example, the corpus includes N documents. A document includes M comments. For example, document i ($i^{th}$ document of the corpus) may have Mi comments. For example, topics from each document in the corpus are extracted. The topics may be extracted from the documents one document at a time. For example, the topics may be extracted from the documents from the most recent topic to the oldest topic. The topic extractor unit may employ rule-based or statistical topic extraction techniques. Statistical techniques, for example, may include Latent Dirichlet Allocation (LDA) techniques and are described in, for example, "http://jmlr.csail.mit.edu/papers/v3/blei03a.html", which is herein incorporated by reference for all purposes. Other techniques for topic extraction may also be useful. The topics may be shared by documents. For example, different documents may have the same topic.

In one embodiment, the topic extractor unit employs statistical modelling. The topic extractor unit generates $\theta_{im}$, $\Phi_k$, $z_{imj}$ and $w_{ij}$ for a corpus having N number of documents, where $\theta_{im}$ is a K-dimensional vector for the distribution of topics in the $m^{th}$ comment of the $i^{th}$ document, where K is the total number of possible topics of all documents in the corpus, $\Phi_k$ is a V-dimensional vector for the distribution of words in topic $k^{th}$, where V is the capacity of words dictionary, $z_{imj}$ is the topic for the $j^{th}$ word in the $m^{th}$ comment of the $i^{th}$ document, and $w_{imj}$ is the $j^{th}$ word in the $m^{th}$ comment of the $i^{th}$ document, which is the only observable variable.

The topic extractor unit processes each document of the corpus, one document at a time.

To illustrate, as an example, the corpus includes two topics <sports, politics> and that the $i^{th}$ document is "President Obama celebrates Spurs at White House". In such a case, $\theta_i$ could be <0.7, 0.3>, which represents the probability of the topics occurring in the document. In another case, assume that the document has only three words {NBA, president, celebrates}. In this case, V=3, indicating the dictionary size. For one topic <sports>, $\Phi_k$ could be <0.7, 0.1, 0.2> indicating that the word NBA appears in the topic <sports> with 70% probability. As for the document, every word in the document has a topic assigned to it, which forms the topic distribution of the document.

As described, a document is constituted by a series of topics. The topics take some proportion of the document. In some instances, a topic may make up a small proportion of the document. In such cases, the topic should be ignored. For example, a threshold $\theta_t$ may be defined to filter topics. A topic which makes up a proportion of the document $\leq \theta_t$ is ignored. The threshold $\theta_t$ may be set at 3% or 0.03. Other threshold values may also be useful. The threshold $\theta_t$ may be set by the user or determined automatically based on various parameters. Other techniques for seting $\theta_t$ may also be useful. If a topic exceeds $>\theta_t$, it is considered for sentiment analysis.

When a topic is considered for sentiment analysis, its support is increased. For example, a support vector sup (1, . . . K) may be used to indicate how often a topic occurs in all posts or documents. The support indicates the amount of times the topic appears as a topic in all the documents, and is scaled by the probability of the topic in a document, such as $\theta_t$.

The mapper unit maps posts to the topics of the topics model created by the topic extractor unit. For example, comments, including original posts and comments are mapped to the topics. A comment may be mapped to one or more topics. The mapping forms comment-topic pairs. For example, a comment-topic pair may be represented as (i, k), where i is the comment or document while k is the topic. For each comment, one or more topics may be assigned to the comment. For example, several topics can also be assigned to the comment, resulting in several comment-topic pairs, one for each topic. As an example, a comment i may be mapped to three topics, $k_1$, $k_2$ and $k_3$. In such a case, mapping generates comment-topic pairs (i, $k_1$), (i, $k_2$) and (i, $k_3$).

The comments may be mapped one comment at a time. For example, comments are mapped one comment at a time. The comments may be processed one at a time based on the time stamp. Other techniques or configurations for mapping comments may also be useful. For example, in some cases, groups of related comments may be processed one group at a time. In another example, documents may be processed one document at a time.

The analyzer analyzes comment-topic pairs generated by the mapper unit. The analyzer analyzes comment-topic pairs to determine sentiments. For example, each comment-topic pair is analyzed and assigned a sentiment opinion (so) based on its creator or holder (h). In one embodiment, a sentiment analysis is performed using natural language processing (NLP).

The sentiment for a topic, unlike support, is only considered once for a user. In one embodiment, a user's sentiment is based on the last sentiment of that user. This is because a user's sentiment may vary over time. As such, the latest so of a user for a topic is used. A quadruple (k, so, h, i) is used to represent a sentiment, where k is the topic, so is the sentiment opinion, h is the comment or post holder, and i is the document, which also is used to indicate the time. For example, quadruples are ordered by time, such as from earliest to latest.

For a topic in a document, the corresponding sentiment polarity from the holder (h) is obtained. For example, a sentiment polarity for a sentiment opinion (so) of h for a topic (k) may be obtained. Various sentiment analysis techniques may also be used to obtain so. For example, keyword spotting, statistical methods and aspect-based techniques may be used. Examples of statistical-based sentiment analysis may include Bayesian inference and support vector machine techniques. As a simple example, three numeric sentiment values may be used to reflect sentiment, +1 for positive sentiment, −1 for negative sentiment, and 0 for neutral sentiment. Other granularities of representing, or techniques to represent, sentiments may also be useful.

There may be instances in which a holder (h) may not express sentiment opinions directly for some topics. For example, h may express sentiment opinions indirectly by agreeing or disagreeing with another holder's opinion. To reflect indirect sentiment opinions, an attitude (at) may be used. For example, an att value of 1 indicates agreement, −1 indicates disagreement and 0 indicates neutrality. The sentiment opinion of h, in such cases, may be expressed as so*att.

In some cases, a post or a document may not contain any topics explicitly. For example the document may express agreement or disagreement to some previous documents. Such cases may employ the use of att to estimate sentiment polarity.

For interpretability, the different types of sentiment opinions of different users for every topic are counted. For example, users that hold positive opinions are counted asp, negative opinions are counted as n, and neutral opinions are counted as ne for every topic. A quintuple (k, sup, p, n, ne) is used to illustrate the topics and corresponding sentiments. A set S of quintuples is provided, with a quintuple for each topic k in the set of topics. A quintuple indicates the sup, p, n ne values for its respective topic k. The popularity, or frequency of topics can be estimated by the support. For example, some criteria, e.g., $O_H$ and $O_L$ ($O_H > O_L > 0$), can be defined for evaluating the overall sentiment polarity of a topic k as follows:

$$so_k = \begin{cases} \text{positive,} & p > O_H \ \& \ n < O_L \\ \text{negative,} & n > O_H \ \& \ p < O_L \\ \text{neutral,} & \text{otherwise} \end{cases}$$

From the quintuple set S, every topic is related to the number of three kinds of people by their sentiment opinions (positive, negative, and neutral). Another variable in this set is the support for this topic, which demonstrates the frequency of the topic mentioned in all posts. Using S, one can easily find the popular topics in all posts, as well as people's sentiment polarities.

The relationship detector unit identifies comment-comment relationships within topics. For example, comment-comment relationships within topics of a document are identified. The relationship detector unit may use time (ordered), sentiment, location, and other context information to detect comment-comment relationships within topics of a document. Other criteria may also be used to determine relationships of comments. The relationship may include various characteristics, such as against, support, neutral, criticize, admire, and other predictors. Providing other relationship characteristics or granularities may also be useful.

The visualizer module enables the user to view various relationships of the corpus. For example, document-topic and comment-comment relationships may be visualized using the visualizer module. A visualizer 172 may be a UI which enables an end user to view results of the sentiment analysis on an end user device. The end user, for example, can browse the relationships among documents, such as their shared topic relationships by time, location, or other contexts. The visualizer includes a drill down function to drill down to each document to discover the comment-comment relationships within a document and their sentiments by topics.

Figure 2:
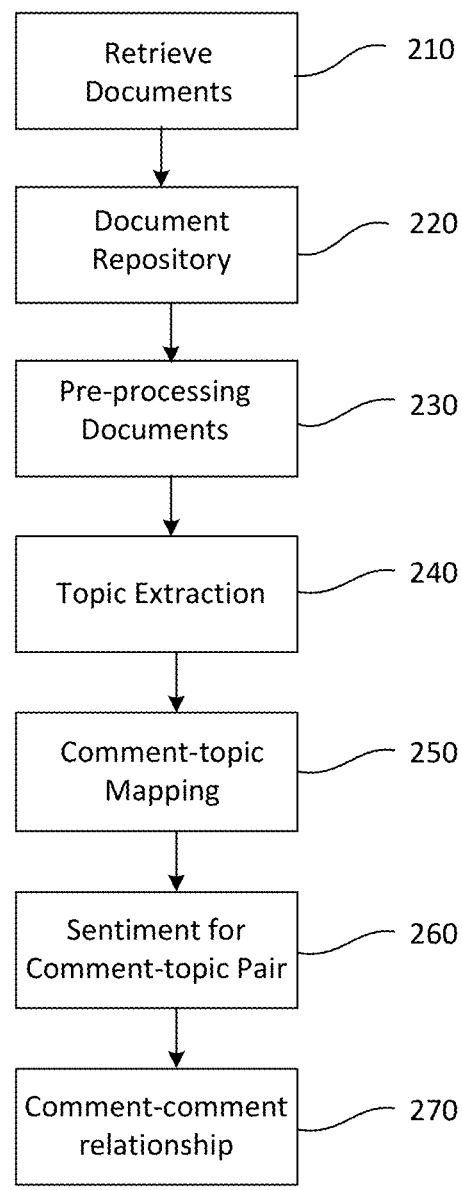
FIG. 2 shows an embodiment of a sentiment analysis flow.

FIG. 2 shows an embodiment of a document sentiment analysis flow 200. At step 210, documents are retrieved. The documents, for example, are on-line posts. A document, for example, includes an origin post and comment posts or comments. The documents are retrieved from the internet and stored in a database. In one embodiment, a data acquisition unit performs document retrieval. The retrieved documents are stored in a repository, such as a database, at step 220. The retrieved documents form a corpus.

The retrieved documents are pre-processed at step 230. A pre-processor unit may be employed to pre-process the documents. Pre-processing, for example, may include data cleaning, stop word removal, stemming and lemmatization, tokenizing, text vectorization and semantics analysis. The pre-processing generates a structured data representation of the documents in the computer memory. In one embodiment, pre-processing may employ vector space model (VSM) to generate vectors. For example, the pre-processing generates document vectors. A document vector may include a plurality of vectors corresponding to posts, such as original post and comments. The pre-processing may be employed to generate other types of data representation structures, such as word distributions.

At step 240, topic extraction from the documents is performed. Topic extraction may be performed by a document topic extractor unit. The topic extractor mines the pre-processed documents to extract topics. For example, the topic extractor mines the document vectors. Topics of all documents in the corpus are extracted. The topic extractor unit may employ rule-based or statistical topic extraction techniques to extract topics. Statistical techniques, for example, may include Latent Dirichlet Allocation (LDA) techniques.

The process continues at step 250 to assign topics to comments, forming comment-topic pairs. For example, topics are assigned to posts of documents, including original posts and comments. Topic mapping, for example, is performed by the mapper unit. The mapping forms comment-topic pairs. A post or comment may be mapped to one or more topics. For example, several topics can also be assigned to a comment, resulting in several comment-topic pairs, one for each topic.

At step 260, a sentiment is assigned for each comment-topic pair. The sentiment assignment, for example, may be performed by the analyzer unit. The sentiment for a topic is only considered once for a user. In one embodiment, a user's sentiment is based on the last sentiment of that user. This is because a user's sentiment may vary over time.

At step 270, the process detects relationships of comments. Detecting relationships of comments may be performed by the relationship detector unit. In one embodiment, the relationship detector unit identifies comment-comment relationships within topics. For example, comment-comment relationships within topics of a document are identified. The relationship identifier unit may use time (ordered), sentiment, location, and other context information to detect comment-comment relationship within topics of a document. Other criteria may also be used to determine relationships of comments. The relationship may include various characteristics, such as against, support, neutral, criticize, admire, and other predictors. Providing other relationship characteristics or granularities may also be useful. Step 270 is repeated until relationships of comments within a document are detected for all documents.

The process may include additional steps. For example, the process may enable visualization of various relationships, such as document-topic and comment-comment relationships. A visualizer module may be provided to enable the user to view various relationships of the corpus. The visualizer module, for example, may be a UI which enables an end user to view results of the sentiment analysis on an end user device. The end user, for example, can browse the relationships among documents, such as their shared topic relationships by time, location, or other contexts. The visualizer includes a drill down function to drill down to each document to discover the comment-comment relationships within a document and their sentiments by topics.

FIG. 3a shows a pseudo code for an embodiment of a sentiment analysis process 300a. As shown, the process retrieves posts and labels them in order of time to create a N-document corpus D. For example, each post is referred to as a document. Retrieval of documents may be performed by a data acquisition module. Pre-processing is performed on the retrieved documents to form document vectors for each document. Pre-processing, for example, is performed by a pre-processor module.

The pre-processed documents are analyzed to extract topics. For example, LDA is used to extract topics from the pre-processed documents of the corpus D. In one embodiment, K topics are extracted from the pre-processed documents of the corpus D. Document-topic (e.g., comment-topic) pairs are generated for the documents of the corpus D. For example, a document may have more than one topic. For example, a document may have more than one comment-topic pair. Topic extraction may be performed by the topic extractor unit of a processor module.

Initialization is performed after generating comment-topic pairs. For example, a data set T is and initialized to empty of NULL. The data set T is a set of quadruples. A quadruple includes the parameters k, so, h, and i, where
k=the topic,
so=the sentiment opinion or polarity,
h=the holder of the comment or post, and
i=the document.
Initialization also includes defining a support vector (sup). The support vector is a K-dimensional vector for K topics determined from topic modelling or extraction. For example, the support vector is expressed as sup(1, . . . , K), indicating support for every topic.

The sentiment for every document-topic pair is determined or calculated. In one embodiment, the sentiment of document-topic pair is determined one document at a time. For example, a loop may be performed N times, determining the sentiment of the first document and is repeated until the last document of the corpus D is calculated.

In one embodiment, a document may include more than one post. For example, a document may include a group of or related posts, such as an original post and comments. An original post or comments may either be referred to as posts or comments. In the pseudo code, the original post or comments each may be referred to as a comment. In one embodiment, the sentiment loop includes an inner or document loop. The document loop performs sentiment analysis for each comment of a document, one document at a time. For example, at the start of each document loop, M is initialized to equal to the number of comments in the $i^{th}$ document (document i).

The document loop includes obtaining holder (h) for the $j^{th}$ comment (comment j) of document i. If the comment j includes topics, a first inner document loop is performed to process each comment-topic pair of comment j. For example, if comment j includes 3 topics, the first inner document loop will be performed 3 times. For each topic k in comment j, the first inner document loop determines whether $\theta_{jk}$, which is the distribution of topic k in comment j, is greater than $\theta_t$. If it is greater than $\theta_t$, the sup(k) is increased or scaled by $\theta_{jk}$.

The sentiment opinion (so) for k is calculated. In one embodiment, k is calculated using a GetSentiment routine. The parameters <i,j> and k are passed to the routine. The routine returns the value of so. The parameters k, so, h and <i,j> are inserted into the dataset T as a quadruple.

On the other hand, if comment j does not have any topics, the comment is analyzed to determine if it is a reply comment of a previous comment j' and j'<j. If it is a reply comment, the att of j is set to j'. A second inner document loop is performed. The second inner document loop is performed for each topic k' in comment j'. The parameter $\theta_{jk'}$ is equal to $\theta_{jk'}$ and sup(k') is increased by $\theta_{jk'}$. The sentiment so' is read for (k', comment(<i,j>). The sentiment opinion (so) for (k, <i,j>) is updated to equal so'*att and the parameters k', so, h and <i,j> are inserted into the dataset T as a quadruple. When all comments of a document are analyzed, the sentiment loop is repeated for the next document.

When all sentiments of all comment-topic pairs of the documents are calculated, the sentiment loop terminates. Next, the holders of every topic are counted. The quadruples in dataset T which have identical (k, h) are identified. All quadruples having identical (k, h) except for the latest one are removed from T. For example, the quadruple with the latest document remains in T. This results in T having only quadruples with a unique (k, h). A new dataset S of quintuples are defined and set to NULL.

The dataset T is analyzed. For example, a loop is performed. The loop is repeated for each unique quadruple in T. The loop includes initializing variables p (positive sentiment), n (negative sentiment) and ne (neutral sentiment) all to 0. An inner loop is performed for each sentiment opinion (so) for topic k. If so is equal to 1, p is increased by 1. If so is equal to −1, n is increased by 1. If so is equal to 0, ne is increased by 1. When all sentiments for topic k are analyzed, the parameters k, sup(k), p, n, and ne are inserted into dataset S.

FIG. 3b shows a pseudo code for an embodiment of a GetSentiment routine 300b used by the sentiment analysis process of FIG. 3a. The inputs to the routine are topic k and comment j of document i. In response to the inputs, the routine generates a sentiment opinion (so). The routine finds the corresponding sentiment opinion of topic k in comment j of document i. If the sentiment opinion is found, it assigns 1, −1 or 0 to so. For example, a 1 is assigned if the so is a positive sentiment, a −1 if the so is a negative sentiment and a 0 if the so is a neutral sentiment. If no sentiment opinion is found, the routine determines if comment j of document i is a reply of an earlier comment j'. If determined, the routine returns so as equal to so'*att. Otherwise, so is equal to 0.

Figure 4A:
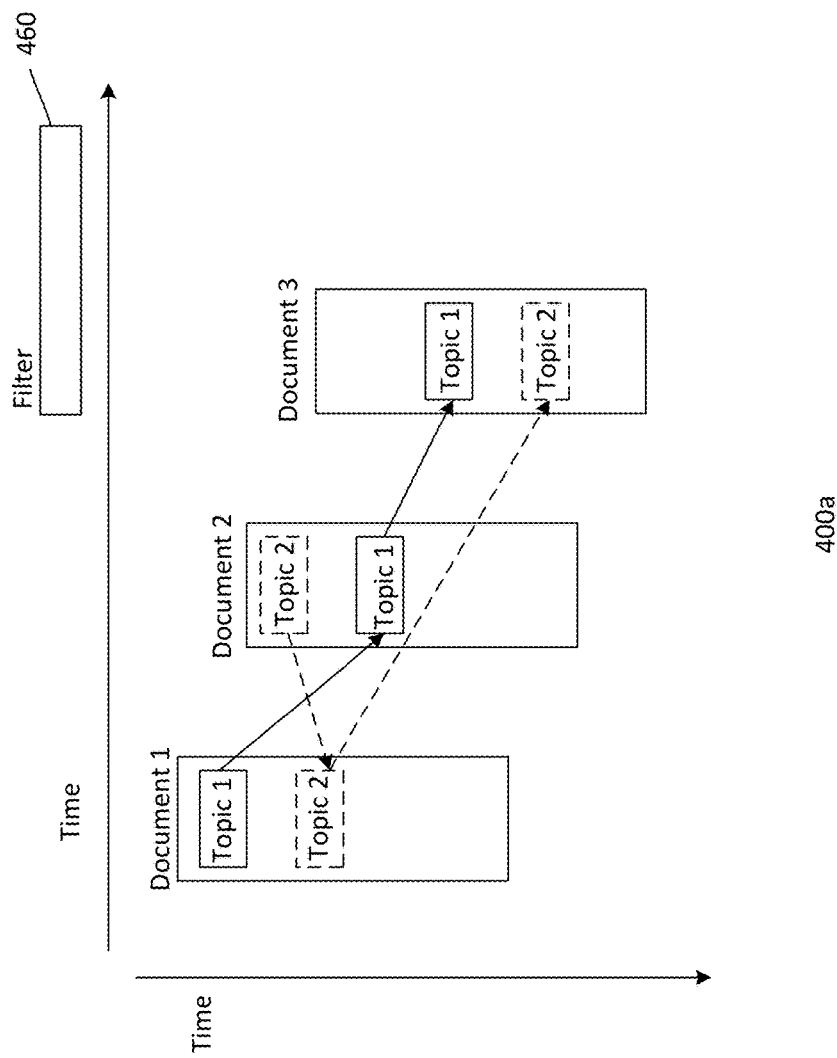
FIGS. 4a-4b show simple illustrations of an embodiment of a user interface.

FIG. 4a shows a simplified user interface (UI) 400a for visualizing results of a query by a user on a UI. The UI includes a filter or search function 460 for providing a query. The query, for example, may filter documents, comments, or topics by word matching or contexts, such as location or time range. Other types of queries may also be useful. An example of a query may be "search comments and documents containing "milk products by brand AAA". The query or filter function may include options, such as comments, documents or topics for a user to select and a text box for entering the text to search.

As shown, the query by the user returns 3 documents, which are Document 1, Document 2 and Document 3. The documents are displayed in a horizontal direction according to time created. Comments within a document as well as across documents are displayed in a vertical direction according to time created. Document 1 includes 2 comments. The first comment is related to Topic 1 (indicated by a solid line) while the second comment is related to Topic 2

(indicated by a dashed line). Document 2 includes a first comment related to Topic 2 and a second comment related to Topic 1 while Document 3 includes a first comment related to Topic 1 and a second comment related to Topic 2.

The UI provides arrows which show relationships between comments and documents. For example, solid arrows illustrate relationships of documents to Topic 1 while dashed arrows illustrate relationships of documents to Topic 2. For example, a comment-document structure is shown.

Figure 4B:
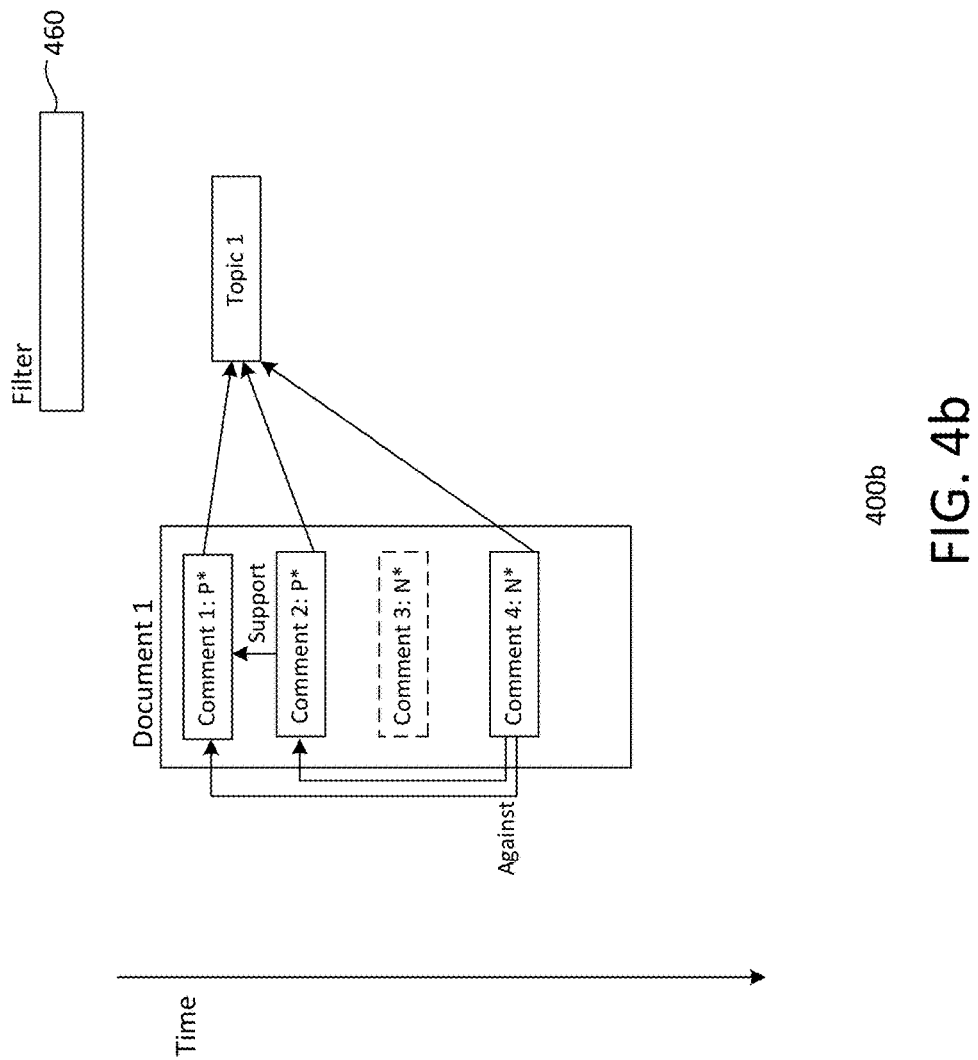

FIG. 4b shows an example of a UI 400b in which a user drills down on a document. For example, Document 1 may be selected by the user to visualize details of the comments therein. As shown, Document 1 includes four comments. The drill down shows comments, sentiments and topic. For example, Comments 1, 2 and 4 are related to Topic 1, as indicated by solid lines and arrows directed to Topic 1. Comment 3 is not directed to Topic 1 and is indicated by a dashed line. Comments 1 and 2 each has a positive sentiment (indicated by P*) while Comments 3 and 4 each has a negative sentiment (indicated by N*).

The UI may include arrows which indicate whether subsequent comments support or are against earlier comments. For example, Comment 2 supports Comment 1 while Comment 4 is against Comment 1 and Comment 2. For example, a comment-comment structure is shown. The UI, as described, enables a user to easily visualize relationships comments and documents to topics as well as sentiments of those topics.

As described, the various modules of the evaluation system may be embodied as an application. For example, the various modules may be embodied as a software application. The modules may be integrated into a client/server or stand-alone software application. The source code or codes of the application may be compiled to create an executable code. The codes, for example, may be stored in a storage medium such as one or more storage disks. Other types of storage mediums may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method performed by a distributed architecture computer system, the method comprising:
   storing a plurality of on-line documents in a computer database to form a corpus, wherein a document comprises one or more comments, wherein the one or more comments of the document comprise one or more holders;
   using a server computer of the distributed architecture computer system to pre-process the documents of the corpus to form a structured data representation of the documents in a memory of the server computer; and
   using the server computer of the distributed architecture computer system to processing the pre-processed documents, wherein the processing comprises:
      extracting topics from the documents of the corpus,
      mapping the documents to the topics to form comment-topic pairs,
      analyzing the comment-topic pairs to determine the sentiments of the topics,
      generating a comment-comment structure that identifies relationships among the comments within the topics of each document in the corpus,
      receiving a query from a client device for a search topic, and
      communicating a response to the query to the client device using the comment-comment structure and the sentiment determined for the search topic.

2. The computer-implemented method of claim 1 wherein pre-processing comprises vector space modelling for generating document vectors.

3. The computer-implemented method of claim 1 wherein extracting topics comprises a Latent Dirichlet allocation (LDA) technique.

4. The computer-implemented method of claim 1 wherein the corpus comprises N number of documents and extracting topic comprises generating:
   $\theta_{il}$, which is a K-dimensional vector for the distribution of topics in the $l^{th}$ comment of the $i^{th}$ document and K is the total number of possible topics of all documents in the corpus;
   $\Phi_k$, which is a V-dimensional vector for the distribution of words in topic $k^{th}$ and V is the capacity of words dictionary;
   $z_{ilj}$, which is the topic for the $j^{th}$ word in the $l^{th}$ comment of the $i^{th}$ document; and
   $w_{ilj}$, which is the $j^{th}$ word in the $l^{th}$ comment of the $i^{th}$ document.

5. The computer-implemented method of claim 1 wherein mapping comprises mapping one or more topics to each comment of the documents to form one or more comment-topic pairs for each comment.

6. The computer-implemented method of claim 1 wherein analyzing the comment-topic pairs comprises natural language processing (NLP).

7. The computer-implemented method of claim 5 wherein analyzing the comment-topic pairs comprises assigning a sentiment opinion (so) based on its holder (h) for each comment-topic pair.

8. The computer-implemented method of claim 7 wherein the sentiment opinion comprises +1 for a positive sentiment (p), a −1 for a negative sentiment (n) and a 0 for a neutral sentiment (ne).

9. The computer-implemented method of claim 8 wherein analyzing the comment-topic pairs generates a quintuple (k, sup, p, n, ne) for each comment-topic pair to form a set S of quintuples.

10. The computer-implemented method of claim 1 comprises visualizing the document-topic structures of the documents and comment-comment structures within each document.

11. The computer-implemented method of claim 1 wherein:
   the corpus comprises N documents and an $i^{th}$ document comprises Mi comments, where i is from 1 to N;
   extracting topics comprises extracting K topics from the N documents; and
   analyzing the comment-topic pairs comprises:
      defining a data set T of quadruple and initialize to null,
      defining a K-dimensional vector sup,
      for each document i, where i=1 to N,
         defining Mi=the number of comments for document i,
         for each comment l of document i, where l=1 to Mi,
            obtaining a holder h from comment l, and
            for each topic k in comment l,
               increasing sup(k) by $\theta_{lk}$, calculating sentiment opinion so for topic k of
comment l of document i, and
inserting (k, so, h, <i, l>) into T,
analyzing data set T after all comments l of all documents i are analyzed to remove quadruples in which k and h are the same except the latest one to result in T with quadruples which have unique k and h, and
creating a data set S of quintuples comprising:
defining S and setting it to null, and
for each topic k in T,
initialize variables p, n, and ne to zero,
for each sentiment so for topic k,
if so equals to 1, then
increase p by 1,
if so equals to −1, then
increase n by 1,
if so equals to 0, then
increase ne by 1, and
insert (k, sup(k), p, n, ne) into S.

12. The computer-implemented method of claim 11 performs an attitude analysis when comment l of document i does not have any topics and comment l is a reply comment, wherein the attitude analysis comprises:
if comment l is a reply of comment l' and l'<l
setting attitude att of l to l',
for each topic k' in comment l'
$\theta_{lk'} \leftarrow \theta_{l'k'}$,
increasing sup(k') by $\theta_{lk'}$,
reading sentiment so' for (k' comment(<i, l>)),
updating sentiment so for (k, (<i, l>) to so'*att, and
inserting (k', so, h, (<i, l>)).

13. The computer-implemented method of claim 11 wherein calculating the sentiment so for topic k of comment l of document i comprises:
finding corresponding sentiment opinion of topic k in comment l in document i, and
if found
assigning 1, −1 or 0 to so;
else if comment l is a reply comment of an earlier comment l',
finding attitude att of l to l' and sentiment so' of topic k in l' and
if found
assigning so'*att to so
else if not found,
assigning 0 to so;
else if not found
assigning 0 to so.

14. A non-transitory computer-readable medium having stored thereon program code, the program code executable by a server computer of a distributed architecture computer system for performing a method comprising:
providing N of on-line documents to form a corpus that is stored in a computer database, where i is from 1 to N, wherein a document i of the corpus comprises Mi comments;
using the server computer to pre-process the documents of the corpus to store a structured data representation of the documents in a memory of the computer; and
using the server computer to process the pre-processed documents, wherein processing comprises:
extracting K topics from the N documents,
mapping the comments of the documents to the topics to form comment-topic pairs, and
analyzing the comment-topic pairs to determine the sentiments of the topics, wherein analyzing comprises:
defining a data set T of quadruple and initialize to null,
defining a K-dimensional vector sup,
for each document i, where i=1 to N,
defining Mi=the number of comments for document i, and
for each comment l of document i, where l=1 to Mi,
obtaining a holder h from comment l,
for each topic k in comment l,
increasing sup(k) by $\theta_{lk}$,
calculating sentiment opinion so for topic k of comment l of document i, and
inserting (k, so, h, <i, l>) into T,
analyzing data set T after all comments l of all documents i are analyzed to remove quadruples in which k and h are the same except the latest one to result in T with quadruples which have unique k and h,
creating a data set S of quintuples comprising
defining S and setting it to null,
for each topic k in T,
initialize variables p, n, and ne to zero,
for each sentiment so for topic k,
if so equals to 1, then
increase p by 1,
if so equals to −1, then
increase n by 1,
if so equals to 0, then
increase ne by 1, and
insert (k, sup(k), p, n, ne) into S, and
identifying relationships of a comment-comment structure within topics of each document in the corpus;
receiving a query from a client device for a search topic; and
sending a visualization of visualizing document-topic and comment-comment structures in response to the query to the client device.

15. The non-transitory computer-readable medium of claim 14 wherein the code comprises performing an attitude analysis when comment l of document i does not have any topics and comment l is a reply comment, the attitude analysis comprises:
if comment l is a reply of comment l' and l'<l
setting attitude att of l to l',
for each topic k' in comment l'
$\theta_{lk'} \leftarrow \theta_{l'k'}$,
increasing sup(k') by $\theta_{lk'}$,
reading sentiment so' for (k' comment(<i, l>)),
updating sentiment so for (k, (<i, l>) to so'*att, and
inserting (k', so, h, (<i, l>)).

16. The non-transitory computer-readable medium of claim 14 wherein calculating the sentiment so for topic k of comment l of document i comprises:
finding corresponding sentiment opinion of topic k in comment l in document i, and
if found
assigning 1, −1 or 0 to so;
else if comment l is a reply comment of an earlier comment l',
finding attitude att of l to l' and sentiment so' of topic k in l' and
if found
assigning so'*att to so
else if not found,
assigning 0 to so;
else if not found
assigning 0 to so.

17. A distributed architecture computer system comprising:
- a data acquisition module executing on one or more server computers of the distributed architecture computer system, the data acquisition module for retrieving a plurality of on-line documents to form a corpus, wherein a document comprises one or more comments, and the one or more comments of the document comprise one or more holders;
- a pre-processor module executing on the one or more server computers of the distributed architecture computer system, the pre-processor module for pre-processing the documents of the corpus to store a structured data representation of the documents in a memory of the distributed architecture computer system;
- a processor module executing on the one or more server computers of the distributed architecture computer system, the processor module configured to:
  - extract topics from the documents of the corpus,
  - map comments of the documents to the topics to form comment-topic pairs,
  - the comment-topic pairs to determine the sentiments of the topics, and
  - identify relationships of comment-comment structures within topics of documents in the corpus; and
- a visualizer module executing on the one or more server computers of the distributed architecture computer system, the visualizer module configured to:
  - receive a query from a client device for a search topic; and
  - communicate a response to the query to the client device, the response using the comment-comment structure and the sentiment determined for the search topic.

18. The computer system of claim 17 wherein the pre-processor a performs vector space modelling for generating comment vectors for the documents, wherein each dimension of a respective comment vector represents a frequency-inverse document frequency of a term in the respective comment.

* * * * *